Aug. 11, 1953     R. E. BOYDEN     2,648,497
ACCUMULATOR DRIVE CONTROL MECHANISM
Original Filed March 13, 1945     10 Sheets-Sheet 1

FIG_1.

INVENTOR.
ROBERT E. BOYDEN
BY
ATTORNEY

Aug. 11, 1953     R. E. BOYDEN     2,648,497
ACCUMULATOR DRIVE CONTROL MECHANISM
Original Filed March 13, 1945     10 Sheets-Sheet 3

INVENTOR.
ROBERT E. BOYDEN
BY
ATTORNEY

Aug. 11, 1953 R. E. BOYDEN 2,648,497
ACCUMULATOR DRIVE CONTROL MECHANISM
Original Filed March 13, 1945 10 Sheets-Sheet 4

INVENTOR.
ROBERT E. BOYDEN
BY
ATTORNEY

Aug. 11, 1953  R. E. BOYDEN  2,648,497
ACCUMULATOR DRIVE CONTROL MECHANISM
Original Filed March 13, 1945  10 Sheets-Sheet 5

INVENTOR.
ROBERT E. BOYDEN
BY
ATTORNEY

Aug. 11, 1953        R. E. BOYDEN        2,648,497
ACCUMULATOR DRIVE CONTROL MECHANISM
Original Filed March 13, 1945        10 Sheets-Sheet 8

INVENTOR.
ROBERT E. BOYDEN
BY
ATTORNEY

Aug. 11, 1953  R. E. BOYDEN  2,648,497
ACCUMULATOR DRIVE CONTROL MECHANISM
Original Filed March 13, 1945  10 Sheets-Sheet 9

INVENTOR.
ROBERT E. BOYDEN
BY
ATTORNEY

Patented Aug. 11, 1953

2,648,497

UNITED STATES PATENT OFFICE 2,648,497

ACCUMULATOR DRIVE CONTROL MECHANISM

Robert E. Boyden, Los Angeles, Calif., assignor to Clary Multiplier Corporation, San Gabriel, Calif., a corporation of California Original application March 13, 1945, Serial No. 582,553. Divided and this application November 27, 1950, Serial No. 197,773

2 Claims. (Cl. 235—60)

The present invention relates to calculating listing and adding listing or the like machines and has particular reference to means for driving such machines.

Generally, most electrically driven calculating or adding listing machines in use at present are of the reciprocating or rack driven type. This form of actuation has been adopted because of the ease of embodying a printing mechanism in cooperation with reciprocating racks and also because of the ease of obtaining and printing totals in rack driven machines.

Because of such reciprocating motion, practically all calculating and adding listing machines were originally built with an oscillating drive shaft to which a drive handle was connected for hand drive operation. As time went on, electric motors were applied to the machines for driving the same but the original oscillating drive shaft was retained to drive the various components of the machine and a connecting rod or the like was generally connected between a rotatable element of the motor drive and an arm on the drive shaft to drive the latter.

Such an oscillating drive has an inherent disadvantage, however, in that the timing of functions during the return motion of the oscillating drive shaft is controlled or restricted by the timing of functions during the forward motion. That is, if a particular portion of the machine cycle is allotted to a particular function during a forward stroke, the same portion of the cycle would generally have to be allotted to some other function during the return stroke or an idle movement of the drive would result.

Further, in such prior machines, the racks were generally differentially advanced to positions limited by depressed keys or the like and thereafter returned to their initial positions while digitizing the accumulator during such return movements. In some machines, the racks digitized the accumulator during their forward movements to effect one type of operation, i. e., subtraction, and digitized the accumulator during the return rack movements to effect another type of operation. Nevertheless, in such machines, time had to be alotted for the tens transfer operation to take place after return of the racks and before the end of the machine cycle.

It therefore becomes a principal object of the present invention to overcome the above defects found in previous rack driven or reciprocating adding and calculating machines.

Another object is to increase the operating speed of a machine of the above type.

Another object is to provide a rotary drive for a machine of the above type.

Another object is to eliminate any idle or waste time during the cycle of a machine of the above type.

Another object is to allocate a relatively large portion of the machine cycle for tens transfer operations without reducing or crowding the remaining operating phases of the machine.

The manner in which the above and other objects of the invention are accomplished will be readily understood on reference to the following specification when read in conjunction with the accompanying drawings, wherein.

The present invention is disclosed in connection with the well known Clary adding machine which is disclosed and claimed in the copending application of Robert E. Boyden, Serial No. 582,553, filed March 13, 1945, and titled "Calculating Machine."

The present application is a division of said copending application and reference is hereby made thereto for an understanding of details of the machine not specifically disclosed herein. However, it is to be understood that at least certain phases of the invention may be applicable to other types of adding or calculating machines.

The machine, in general, comprises a rotary drive shaft controlled by a cyclic clutch effective to rotate the shaft one revolution for each machine cycle. Digitation is effected during the first half of the machine cycle and the same portion of the cycle is employed for either additive or subtractive entries. For this purpose, the drive racks digitize the accumulator while being differentially driven forwardly under control of depressed keys of the keyboard, the racks at the same time registering the printer for the printing operation. Upon completion of the forward or digitizing stroke of the racks, the printing operation takes place and thereafter the racks are returned to their home positions during a portion of the latter half of the cycle. During this time and, in fact, before completion of the printing phase, the tens transfer phase commences and is allowed to continue for the remainder of the cycle. Since substantially one-half of the machine cycle is allocated to tens transfer operation, it is possible to utilize a subsequent, positively operated transfer mechanism and such mechanism is relieved of any critical or crowded timing requirements. Also, a relatively large capacity, i. e., a large number of denominational orders, may be incorporated in the machine while still permitting adequate time for effecting tens transfer from order to order as would be the case in a carry wave resulting, for example, in adding one to a total of nine's registered in the accumulator. These features permit an overall increase in the speed of the machine.

Figure 1:
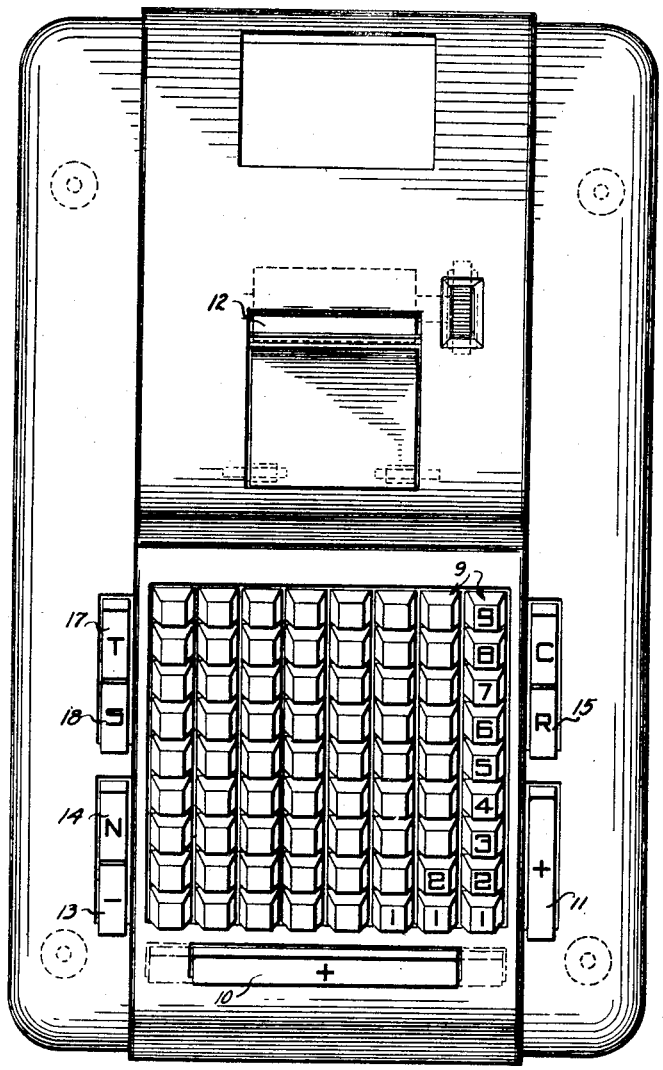
Fig. 1 is a plan view of a machine embodying a preferred form of the invention.
Figure 2:
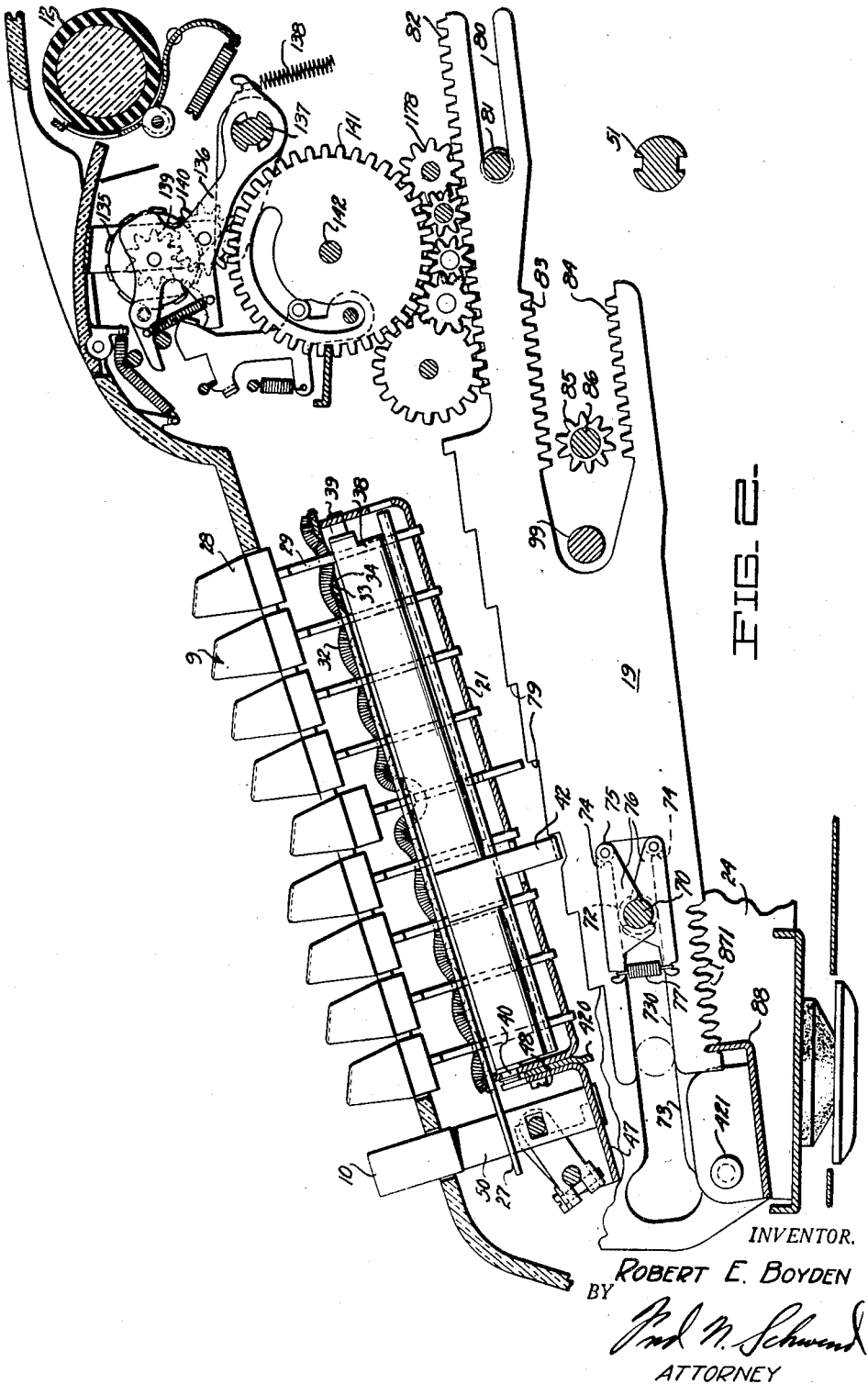
Fig. 2 is a longitudinal sectional view illustrating the general arrangement of the keyboard, accumulator and printer mechanisms.

Referring in general to Figs. 1 and 2, an amount is entered in the machine by depressing appropriate amount keys 9. In order to add this amount, one or the other of two add bars 10 and 11 is depressed. This amount is then added into an accumulator comprising gears 85 and is also printed on a paper strip (not shown) fed over a platen 12. If the amount set on the keys 9 is to be subtracted from an amount stored in the accumulator, a minus bar 13 is depressed.

If it is desired to print an amount set up on the keys 9 but not to add the same in the accumulator, a non-add bar 14 would be depressed. If it is desired to add the same amount in the accumulator two or more times, a repeat bar 15 is depressed and held down until the requisit number of additions are made.

When it is desired to obtain a total stored by the accumulator, a total bar 17 is depressed. This will clear the accumulator and print the total. When it is desired to obtain a sub-total a sub-total bar 18 is depressed.

*Keyboard*

The keyboard is of the flexible type and each amount key 9 (Figs. 1 and 2), when depressed, serves as a stop to limit movement of an aligned drive rack 19 which both drives the accumulator to enter therein a value corresponding to the value of the depressed key and also sets the printing mechanism to print such value.

Each of the keys 9 comprises a key top 28 and a key stem 29 guided in aligned slots formed in a top plate 27 and a bottom frame plate 21. The keys in each bank are yieldably pressed upward by a tension spring 32 extending the length of the keyboard and suitably attached at opposite ends to the plate 27. Said spring rests on cross ribs 33 formed across slots 34 in the plate 27 and extends into openings in each of the key stems. Upon depression of a key the adjacent portions of the spring are stretched and extend downwardly through the slots 34.

Means are provided for locking the keys 9 in their depressed positions and for releasing any depressed key. Each key stem has a cam lobe (not shown) formed thereon which, when the key is depressed, rocks a locking bail 38 pivoted at opposite ends thereof to the front and rear walls of the key frame 21 by trunnion bearings 39 and 40. At the bottom of its stroke the cam lobe on a depressed key stem passes below the bail enabling the latter to retract partially under the action of a spring (not shown) to a position wherein it latches the key depressed. A zero stop 42 integral with each locking bail 38 will be held in front of a shoulder on the associated drive rack 19 when no key associated with such rack is depressed, thereby preventing any substantial forward movement of the rack during subsequent phases of operation of the machine. However, when any amount key is depressed and latched down the bail 38 will be held outward sufficiently to retain the associated zero stop out of the path of the rack.

Figure 11:
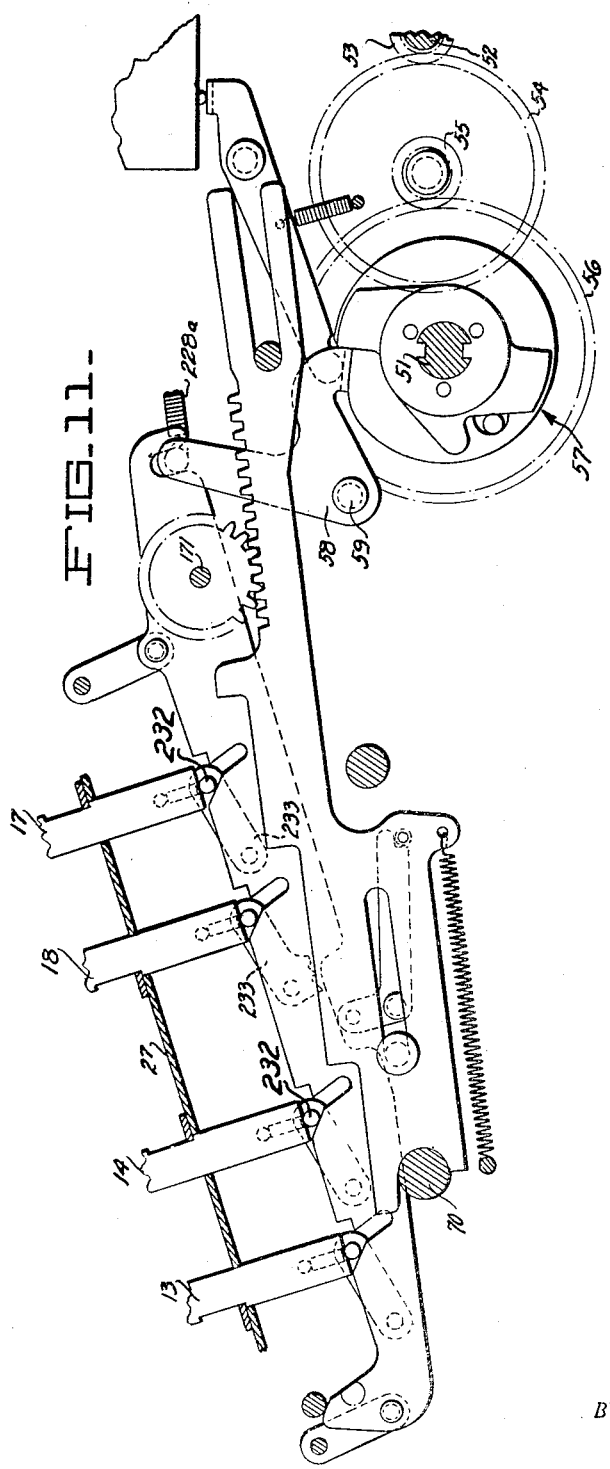
Fig. 11 is a side elevational view illustrating the clutch controls.
Figure 12:
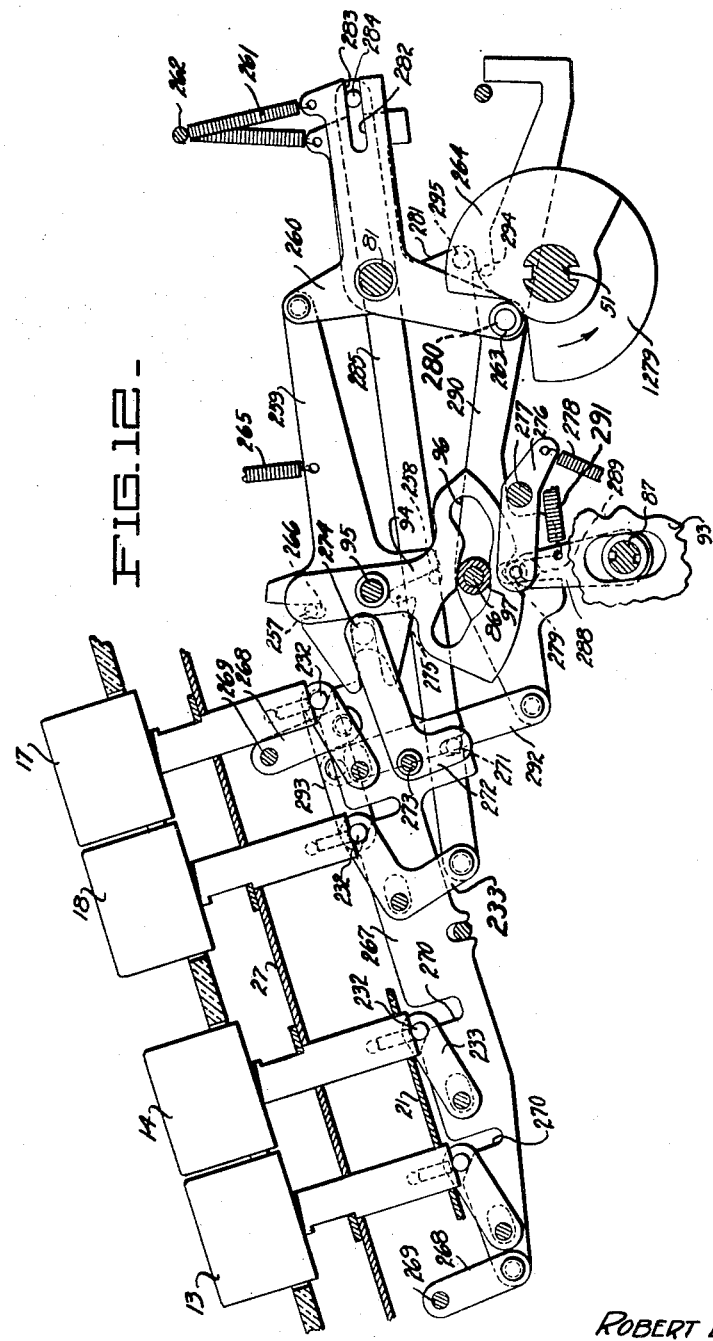
Fig. 12 is a side view of the controls for the accumulator.
Figure 13:
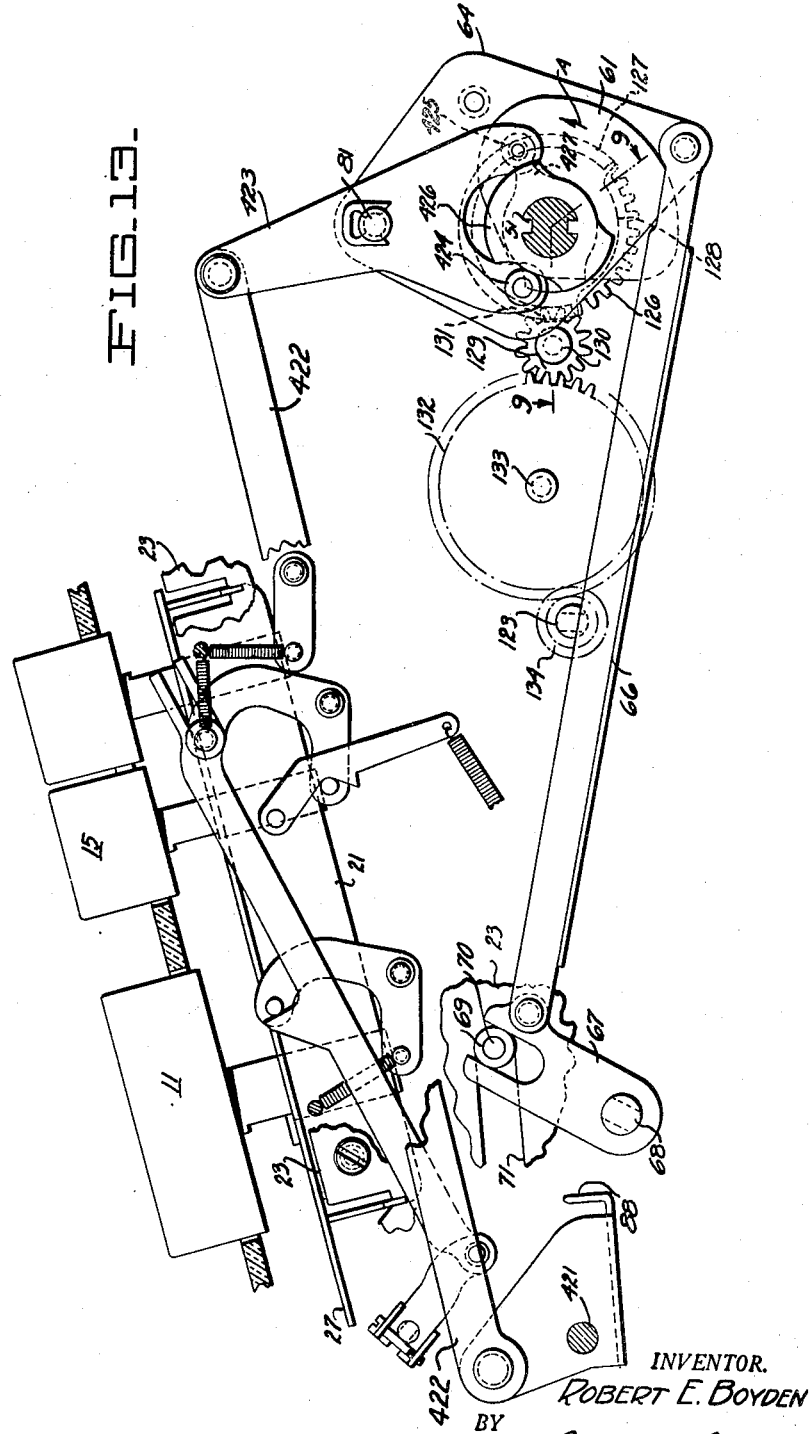
Fig. 13 is a side view illustrating the rack lock, rack drive, and tens transfer unit drive.

Referring to Figs. 11, 12 and 13 the stems of the various control bars are also guided in slots provided in the keyboard frame 21 and top plate 27. The add bar 10 has a pair of stems, one of which is shown at 50 (Fig. 2) slideable vertically in aligned slots formed in the key top plate 27 and brackets 47 extending from the frame 21.

*Drive*

As mentioned hereinbefore, the principal feature of the present invention is the provision of a main shaft 51 which is rotatable through 360° during each cycle and carries various cams for operating the different components of the machine. The shaft 51 also drives the reciprocating mechanism for moving the accumulator drive racks 19 through their strokes. Thus, the cams may be designed to incorporate any desired characteristics which may vary throughout the cycle.

Referring to Fig. 11 the drive shaft 52 of a motor (not shown) is entrained with the shaft 51 through a gear 53 on the motor shaft which meshes with an idler 54 rotatably mounted on a stud extending from the frame of the machine. A pinion 55 secured to the idler 54 meshes with a gear 56 rotatable on the shaft 51 and suitably connected to the driving side of a cyclic clutch generally indicated at 57, the driven side of which is secured to the shaft 51.

The clutch is controlled by a dog 58 pivoted at 59 and arranged to effect engagement of the clutch upon counter-clockwise rocking thereof against the action of a tension spring 228a. Disengagement of the clutch is effected by permitting the spring 228a to rock the same clockwise into the position illustrated in Fig. 11.

Figure 9:
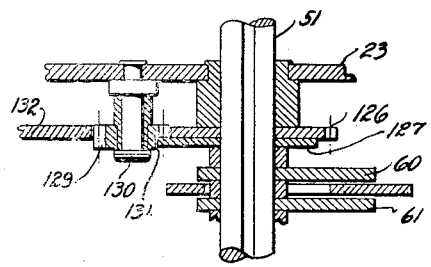
Fig. 9 is a sectional view illustrating the tens transfer drive gears and rack drive cams and is taken along the line 9—9 of Fig. 13.
Figure 10:
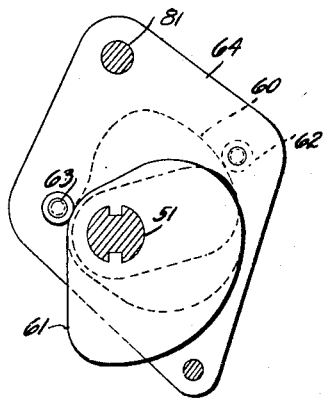
Fig. 10 is a side view of the rack drive cams and cam follower therefor.

Means are provided for yieldably transmitting a drive from the drive shaft 51 to the various racks 19. Referring to Figs. 9, 10 and 13 a pair of juxtaposed complementary rack drive cams 60 and 61 are keyed to the shaft 51. These cams are engaged by rollers 62 and 63, respectively, mounted on a cam follower plate 64 pivoted on the cross rod 81. A link 66 is pivotally connected between the lower end of the cam follower plate 64 and an arm 67 secured to a rock shaft 68 which is journaled in bearings (not shown). The arm 67 is bifurcated to embrace a roller 69 journaled on one end of a laterally shiftable rack drive shaft 70. The roller 69 is also guided for transverse movement within a longitudinal extending slot 71 in the machine frame plate 23. A similar roller 72 (Fig. 2) on the opposite end of the shaft 70 is guided along a slot 73 (similar to slot 71) in the left hand machine frame plate 24 and a second arm (not shown) similar to arm 67 is fixed to the shaft 68 to guide the left hand of the shaft 70.

Referring to Fig. 2, each of the drive racks 19 has an elongated slot 730 therein embracing the shaft 70 whereby to support the forward end of the rack. The slot 730 terminates at its rear in opposed notches 74. Each notch 74 is normally engaged by rollers 75 carried by pawls 76 which are rockably fitted within a groove in the shaft 70. The adjacent drive pawls 76 associated with any one rack are spring urged in opposite directions about the shaft 70 by a tension spring 77 connected between the tails of the two pawls, thus forming a yieldable connection between the shaft 70 and the respective drive rack 19.

When, during the forward movement of the shaft 70, a particular rack 19 is stopped due to striking a depressed key stem 29 or the associated zero stop 42 or a stationary "9 stop" 420 as will occur only when the "9" amount key has been depressed, the rollers 75 will ride out of the notches 74 against the action of spring 77 thus breaking the connection between the shaft and the rack.

Referring to Fig. 2, each rack is provided with equally spaced shoulders 79, the spacings of which are slightly larger than the spacings of the keys 9 so that the rack, when advanced toward the front of the machine, will strike the lower end of a depressed key after it has been advanced a number of increments equal to the value of a depressed key. When a "9" key has been depressed, the rack will move through nine increments until the second shoulder 79 from the left thereof will strike the stop bar 420.

Each rack in addition to being guided by the shaft 70 is provided with a slot 80 adjacent the rear end thereof which is guided over the stationary cross rod 81.

A rack gear section 82 is formed on the upper edge of each rack 19 for the purpose of meshing with one of a series of gears operatively connected with the printing mechanism as will be described hereinafter. Also formed on each rack is a pair of opposed rack gear sections 83 and 84 disposed on opposite sides of an associated accumulator gear 85 rotatably mounted on a shaft 86 forming part of the accumulator unit.

A series of notches 871 are formed on the under forward edge of each rack 19 and are spaced apart distances equal to the different increments of movement of the rack and are adapted to be engaged by a locking bail 88 before and after both the forward and return movements of the rack. For this purpose, the bail 88 is pivoted at opposite ends on frame pins 421 and is connected by a link 422 (Fig. 13) to a cam follower 423, pivoted on shaft 81, and carrying rollers 424 and 425 which ride on complementary cams 426 and 427, respectively, both keyed on the drive shaft 51.

Figure 16:
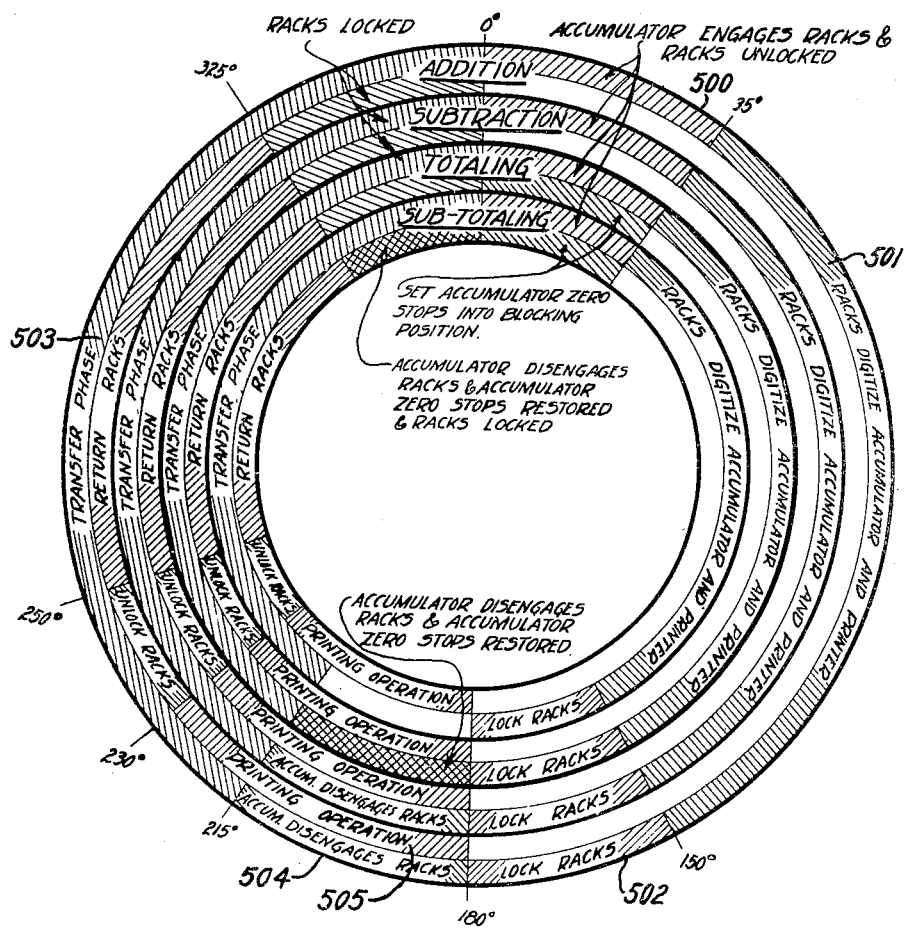
Fig. 16 is a timing chart illustrating generally the successive phases of operation of the machine.

As will be described hereinafter, means operated by the shaft 51 are provided to raise or lower the accumulator gears 85 into mesh with either of the rack sections 83 and 84 to effect additive or subtractive entries into the accumulator. This movement of the accumulator is effected during the first 35° of a machine cycle as indicated at 500 (Fig. 16).

During this period the cams 426 and 427 become effective to move the locking bail 88 to unlock the various racks 19. Immediately thereafter the rack drive cams 60 and 61 commence driving the racks through their forward or digitizing movement. This rack drive movement extends over 115° of the machine cycle as indicated at 501 until 150° of the cycle has been reached. Thereafter, the cams 426 and 427 become effective during the next 30° to cause the lock bail 88 to lock the drive racks as indicated at 502 so that at the mid point or 180° of the cycle the racks will be completely locked in their differentially advanced positions.

*Accumulator*

The accumulator is of the two direction, subsequent transfer type in which tens transfer increments are entered into the accumulator gears under power.

Referring to Figs. 3 to 6, inclusive, the gears 85 forming the accumulator elements are lowered from a neutral position illustrated in Fig. 2 into mesh with the rack gear sections 84 during additive operations whereby the gears will be rotated in a clockwise direction during the subsequent forward or digitizing movement of the racks. During a subtractive operation, the accumulator is raised into mesh with the upper rack gear sections 83 so that the subsequent forward rack movement will drive the gears in a counter-clockwise direction.

The accumulator comprises in general the aforementioned accumulator shaft 86 and a second shaft 87 rotatably mounted in a series of spaced brace plates 88' rigidly held in spaced relation to each other by a pair of combs 89.

Figure 8:
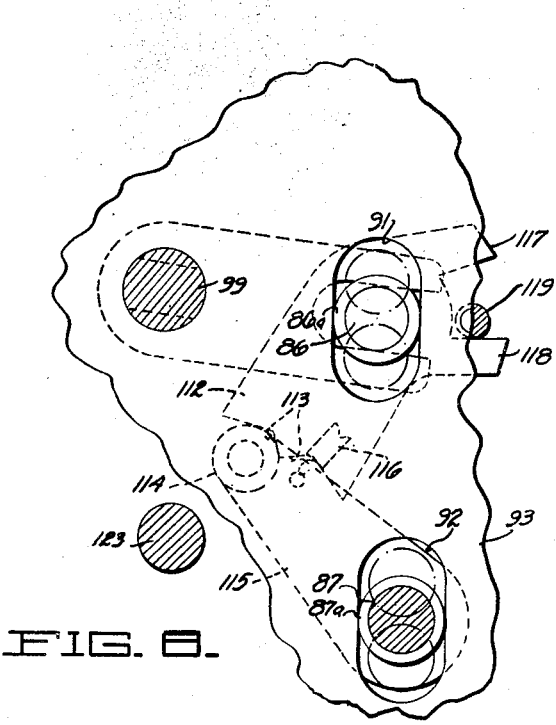
Fig. 8 is a side view illustrating the mechanism for adjusting the accumulator to add or to subtract conditions.

The shafts 86 and 87 have rollers on opposite ends thereof, two of which are shown at 86a and 87a in Fig. 8 which are guided in vertical slots 91 and 92, respectively, formed in plates 93 which are suitably attached in a manner not shown to the machine frame plates 23 and 24.

During the digitizing phase of each operation and as any one of the accumulator gears 85 move through one complete revolution or ten tooth spaces as a result of accumulating ten digits in its associated order it conditions a transfer mechanism to subsequently enter one digit into the next arithmetically higher order.

For the purpose of effecting a transfer each gear 85 has a transfer tooth 101 fastened thereto and adapted to engage a roller 102 carried on a stud 103 extending from a transfer arm 104 located in the next order to the left. Arms 104 are freely pivoted on the shaft 87 and are each yieldably held in one or the other of two positions by a centralized arm 106 pivoted on the shaft 86 and provided with two notches either of which is adapted to embrace the stud 103. A spring 107 is interposed between the centralizer and the adjacent brace plate 88'.

Figure 3:
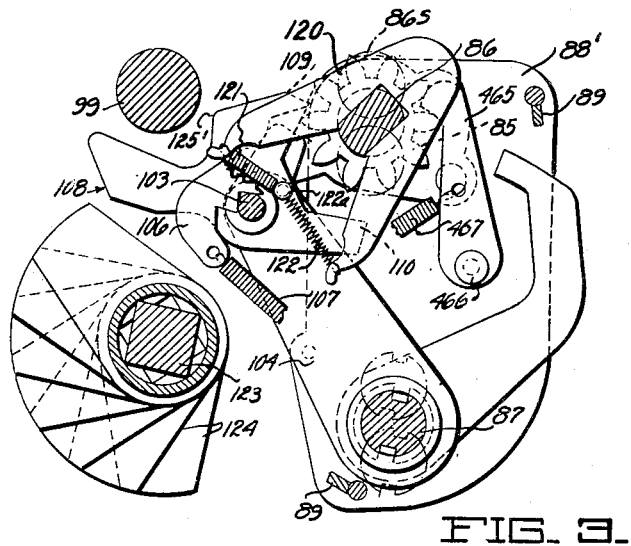
Fig. 3 is a sectional view through the accumulator and is taken along the line 3—3 of Fig. 6.
Figure 4:
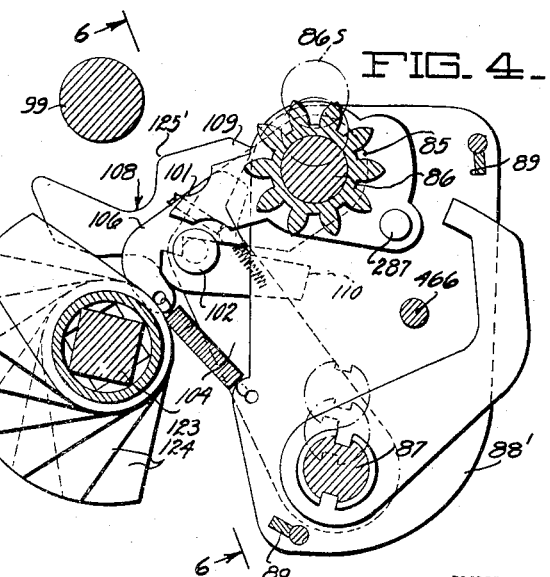
Fig. 4 is another section view through the accumulator and is taken along the line 4—4 of Fig. 6.
Figure 5:
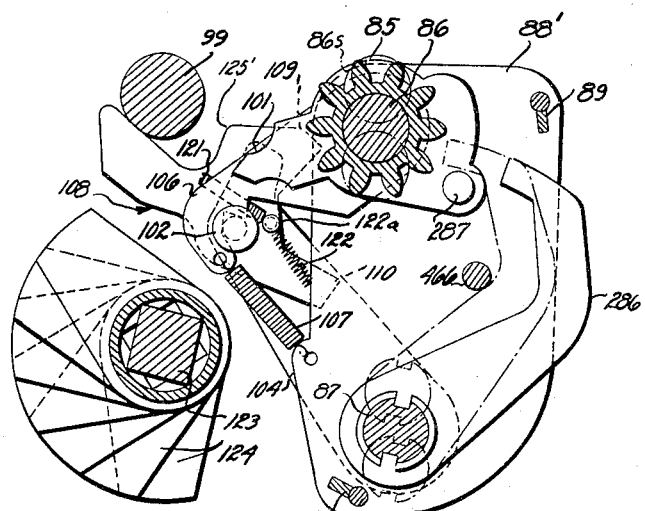
Fig. 5 is a sectional view, similar to that of Fig. 4, but showing the parts in condition for effecting a tens transfer.

As each gear 85 rotates in either direction through one complete revolution or between its zero and 9 registrations (the zero position being shown in Figs. 4 and 5) the associated transfer tooth 101 strikes the roller 102 and rocks the arm 104 outwardly from its normal position shown in Figs. 3 and 4 to its transfer conditioning position illustrated in Fig. 5.

Also pivoted on each stud 103 is a transfer pawl 108 formed with two diverging fingers 109 and 110 located on opposite sides of the associated gear 85. The pawl 108 is rocked into either of two positions shown in Figs. 5 and 7 depending on the direction of transfer to be effected whereby to engage one or the other of the fingers 109 and 110 with the gear 85. During the subsequent transfer operation, arm 104 is rocked rearward toward the shaft 86 into its normal position and whichever transfer pawl finger is in engagement with the gear 85 will drive the same one tooth in the appropriate direction.

In order to hold each gear 85 in registered position a pawl 465 (Fig. 3) is pivoted at 466 on the adjacent brace plate 88' and is held in engagement with the respective gear by a spring 467.

Means are provided for conditioning the transfer mechanism to effect an additive or subtractive transfer depending on the direction in which the accumulator is driven. As was disclosed hereinbefore, the accumulator is lowered from its neutral position during additive operations and is raised from its neutral position during subtractive operations. This movement is utilized to condition the transfer mechanism to drive the gears in the correct direction.

Referring to Fig. 8, a throw over lever 112 is fixed on the shaft 86 and is provided with two centralizing notches 113 formed thereon, either of which is engaged by a roller 114 on a centralizing arm 115 which is pivoted on the shaft 87 and pressed against the lever 112 by a spring 116. The rear end of arm 112 is bifurcated to form two extensions 117 and 118, either of which is adapted to engage a stationary stud 119 extending from the stationary plate 93 for the purpose of rocking the lever from one angular position to the other when the accumulator is raised or lowered.

Figure 6:
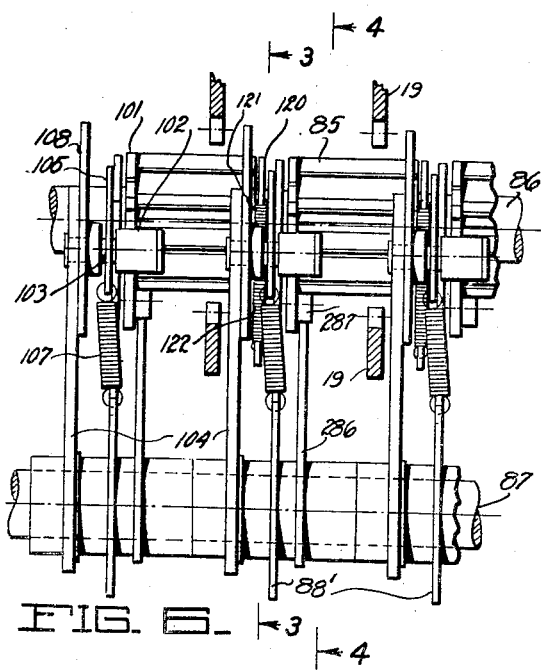
Fig. 6 is a lateral view of two orders of the accumulator and is taken substantially along the line 6—6 of Fig. 4.
Figure 7:
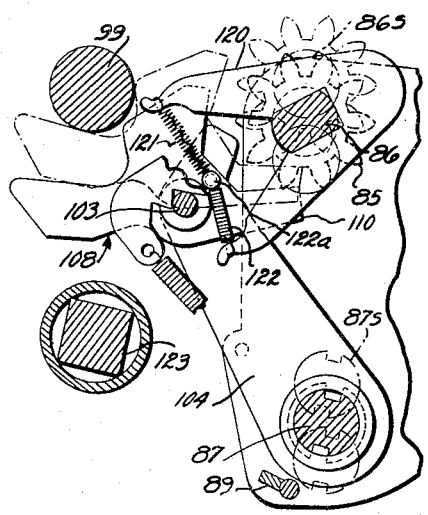
Fig. 7 is a view similar to Fig. 3 illustrating the machine in the subtract condition and in a condition which it assumes during sub-total operations.

A U-shaped spring carrier 120, Figs. 3, 6 and 7, is secured on the shaft 86 in each order. The two arms of each carrier support the ends of two tension springs 121 and 122, the other ends of which are connected to a stud 122a fastened to the transfer pawl 108. Rocking of the shaft 86 in one direction by virtue of the movement of the accumulator unit through the rocking means of Fig. 8 will tension one of the springs 121 and 122 and relax the other thereby urging the transfer pawls in one direction or the other while rocking the shaft in the opposite direction will cause the carriers 120 and springs to urge the transfer pawls in the opposite direction.

Means are provided for effecting a tens transfer sequentially across the various orders of the accumulator beginning with the lowermost or right hand order. For this purpose, a transfer shaft 123 is rotatably mounted in a manner not shown adjacent the brace plates 88' of the accumulator unit and a series of cams 124 arranged therearound in a helical series to sequentially engage the rollers 102 of the transfer arms 104 which have previously been moved outward to transfer conditions.

During a transfer operation, as each arm 104 is forced rearward by its cam 123 one or the other of the fingers 109 and 110 of the associated pawl 108 will engage and drive the aligned accumulator gear 85 one tooth space.

The foregoing transfer operation, i. e., rotation of shaft 123, will occur during the latter 145° of the cycle as shown at 503, Fig. 16. This will occur immediately after the accumulator has been returned to neutral from engagement with the drive racks 19 which occurs during the phase 504, i. e., during the thirty-five degree phase immediately following the 180° point in the cycle. Because of the abnormally large portion of the cycle allocated to the tens transfer operation considerable time may be allowed to insure a complete transfer from one order to the next before transfer to the still next higher order takes place. Also because of such large allowed span of transfer phase a relatively large capacity or number of orders may be incorporated in the machine without unduly crowding the transfer phase.

It will be noted in Fig. 16 that during sub-totalling operations the accumulator is not disengaged from the racks until the end of the cycle and therefore some provision must be made to prevent operation of the transfer mechanism from operating during the time normally allocated to the transfer phase. For this purpose, the transfer pawl 108 is provided with a projection 125'. During the sub-total operation the accumulator is raised into a subtractive position in which the shafts 86 and 87 assume their dotted line positions 86S and 87S, respectively (Fig. 7), while the transfer pawls are rocked counter-clockwise due to the subtractive setting of the shaft 86. Now, as the arms 104 are carried upwardly by the accumulator unit, the projections 125' engage a cross shaft 99, rocking the transfer pawls so as to retain both fingers 109 and 110 out of engagement with the gears 85 as indicated by the dot and dash lines of Fig. 7.

For the purpose of rotating the transfer shaft 123 during the latter portion of the machine cycle, a mutilated gear 126 (Figs. 9 and 13) and a disc 127 are keyed in juxtaposition with each other on the shaft 51. The disc 127, has a depression 128 formed in the edge thereof in alignment with the teeth of the mutilated gear 126. The gear 126 is adapted to mesh with a wide pinion 129 rotatably mounted on a frame stud 130. The portion of the pinion 129 in alignment with the pinion 126 is fully toothed while the portion in alignment with the disc 127 has a pair of adjacent teeth cut away to form a bearing surface 131 against which the disc 127 rides whereby to prevent rotation of the pinion whenever the teeth of gear 126 are out of mesh with the teeth of the pinion. The pinion 129 is arranged to drive the transfer shaft 123 through an idler 132 meshing with the pinion and journaled on a frame stud 133, the idler meshing with a pinion 134 fixed to the shaft 123.

Printer

The printer (Fig. 2) comprises a series of numeral printing wheels 135, one for each of the racks 19. Each numeral wheel has thereon a series of type ranging progressively from 0 to 9 and these wheels are so connected to their associated racks that they will print a digit corresponding to the value of the key depressed in the associated key bank or to the numerical position to which the rack has been advanced.

Each wheel 135 is rotatably mounted on a separate lever 136 which is loosely keyed to a printer shaft 137 and spring urged by tension spring 138 extending between the lever and a suitable portion of the frame. Each wheel 135 has secured thereon a gear 139 permanently meshed with an idler gear 140 also rotatably mounted on the associated lever 136. When each lever 136 is held in its normal position illustrated in Fig. 2 by the shaft 137, the gear 140 is meshed with an aligned one of a series of large idler gears 141 rotatably mounted on a cross shaft 142. The latter idlers are continuously entrained with respective ones of the drive racks 19 through a series of pinion assemblies, i. e. 178, the details of which it is not deemed necessary to disclose herein.

Figure 15:
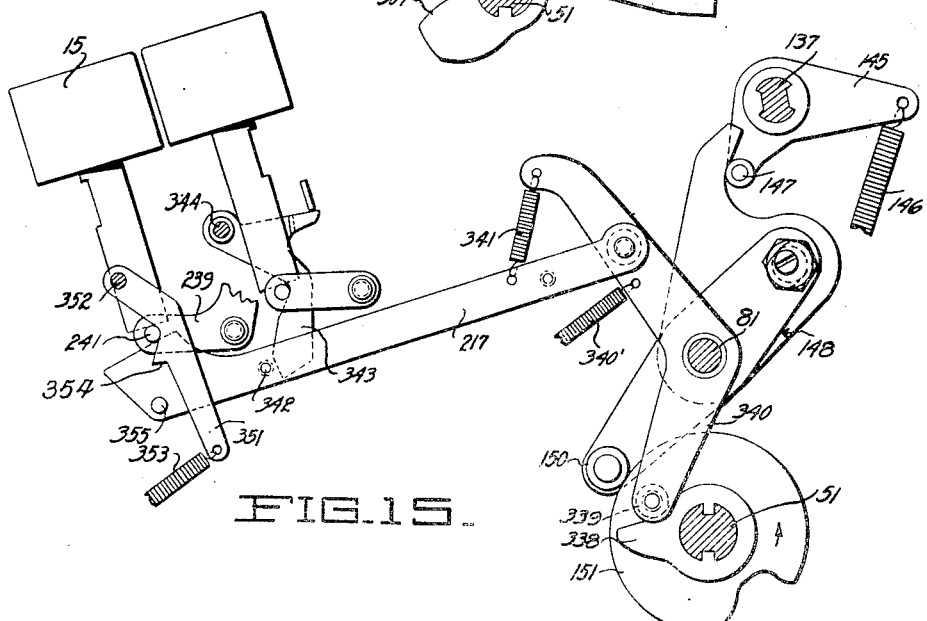
Fig. 15 is a side view illustrating the key release mechanism and the printer control shaft operating device.

Referring to Fig. 15, the printer control shaft 137 has keyed thereto a lever 145 urged clockwise by a tension spring 146 and is provided with a roller 147 held against a camming lever assembly 148. The latter is pivoted on the shaft 81 and has a roller 150 on the lower end thereof which rides on the periphery of a cam 151 keyed to the drive shaft 51.

The accumulator is raised or lowered to mesh the accumulator gears 85 with either the upper rack gear sections 83 or the lower gear sections 84 of the drive racks depending on the type of operation to be performed. For this purpose, mechanism is provided under control of the different aforementioned control bars for determining and effecting the positioning of the accumulator.

For this purpose, a box cam 94 (Fig. 12) is pivoted on a frame stud 95 and has a cam groove 96 therein embracing a roller 97 on the accumulator shaft 86 on the left hand end thereof. Clockwise movement of the cam in a manner to be described presently will lower the accumulator while counterclockwise rocking thereof from its illustrated position will raise the accumulator to its subtractive position.

The cam 94 carries a pair of pins 257 and 258 arranged on opposite sides of the frame pin 95. These pins are adapted to be selectively engaged by a hook member 259 connected to a three arm cam follower 260. The cam follower is urged counterclockwise by a spring 261 tensioned between one arm of the cam follower and a frame pin 262 to press a roller 263 on one arm thereof against a cam 264 keyed on the drive shaft 51. The cam has a high portion extending over substantially half of its periphery whereby to rock the cam follower and thereby position hook 259 rearward (and the accumulator in raised or lowered position) during the period extending from 35° to 180° of the machine cycle.

Normally, during additive operations, or when the machine is at rest, the hook 259 will be held in a raised position by a tension spring 265 whereby a slot 266 therein embraces the upper pin 257 so that if the hook is moved rearward it will rock the cam 94 clockwise to lower the accumulator into its additive position.

For the purpose of locating the hook member 259 in a lowermost or intermediate position for setting the accumulator in additive or non add positions, respectively, a control bar 267 is provided being supported for a longitudinal movement by a pair of links 268 pivoted at 269. The bar 267 has four camming surfaces 270 therein underlying the aforementioned pins 232 operable by the different control bars at the left side of the machine. The bar 267 is connected through a pin-and-slot arrangement 271 to a bell-crank 272 pivoted at 273 and connected by a pin-and-slot arrangement 274 to the hook 259.

The camming surfaces of the bar 267 are so arranged that upon depression of the minus bar 13, the total bar 17, or the sub-total bar 18, the bar 267 will be moved forward its fullest extent so as to lower the hook member 259 to a position wherein the slot 275 therein embraces the pin 258 of the box cam. On the other hand, the cam surface 270 associated with the non-add bar 14 is so formed that upon depression of this bar the control bar 267 will be moved only half way through its stroke so that the hook member 259 will be located in an intermediate position in which neither of the slots 266 or 275 will embrace their associated pins. Consequently, upon operation of the machine and rotation of the cam 264, the hook member will be ineffective to actuate the box cam 94 from its neutral illustrated position when the accumulator unit is likewise held in a neutral position.

During an additive or subtractive operation and at the 180° point in the machine cycle the high portion of the cam 264 will pass the roller 263, permitting the spring 261 to return the cam follower 260, hook 259 and box cam 94 to their positions illustrated in Fig. 12.

In order to maintain the accumulator and box cam 94 in their neutral positions, as illustrated in Fig. 12, a centralizer lever 276 pivoted at 277 is urged by a spring 278 against the lower arcuate periphery of the box cam. When the cam is in its neutral illustrated position, the roller 279 on the lever 276 enters a detenting notch in the periphery of the cam.

In totalling operations, the accumulator is returned to zero during the first part of the operating cycle and is then placed in a neutral position in the same manner as in normal addition and subtraction operations during the return movement of the racks. In sub-totalling operations, the accumulator is returned to zero during the first part of the cycle and is again reset at its former accumulated value after the printing operation and during the latter part of the cycle normally allotted to the transfer phase. Therefore, it is necessary in the latter operation to maintain the accumulator in mesh with the drive racks until after the racks have returned from their forward strokes. To this end a second cam 1279 is keyed on the shaft 51 adjacent the cam 264 and is provided with a high portion around the greater portion of the periphery thereof. This cam engages the roller 280 on a second bell-crank 281 also pivoted on the shaft 81 adjacent the cam follower 260. A slot 282 is formed on the rearwardly extending arm of the bell-crank 281 which is normally in line with a slot 283 formed in the cam follower 260. However, it will be noted that the rearward extension of the bell-crank 281 is somewhat shorter than the similar extension of the cam follower 260 and the slot 282 is correspondingly shorter. A pin 284 carried by the link 285 rides within one or both of the slots 282 and 283 depending on its position longitudinally of the machine. The link 285 is connected to the lower arm of the lever 233 which is associated with the sub-total bar 18 and is so arranged that when the bar 18 is in its raised position, as illustrated in Fig. 12, the pin 284 will be located solely within the slot 283. However, upon depression of the bar 18 the pin will be moved forwardly to locate within both slots 282 and 283. In this condition, during a sub-totalling operation, the two cam followers 260 and 281 will move as a unit and the cam 1279 will therefore control the hook 259 to hold the accumulator engaged with the drive shaft throughout the major portion of the cycle, i. e. from a point 35° in the cycle to a point 325°, the cam 1279 permitting the spring 261 to return cam 94 and thus return the accumulator to neutral during the remaining 35° of the cycle.

In totalling and sub-totalling operations the keyboard is not utilized to control the extent of movement of the racks but instead the racks are controlled by their various accumulator gears in returning from their accumulated increments of rotation to their zero positions.

Referring to Fig. 5, a series of zero stop arms 286 are keyed on the shaft 87 and during totalling and sub-totalling operations these arms are rocked by the shaft 87 into blocking positions indicated by the dot and dash lines in Fig. 5 to block zero locating pins 287 carried by the accumulator gears 85. Thus, when the gears are rotated counter-clockwise by the drive racks 19 they will return to zero positions at which time they are blocked by the levers 286 thereby breaking the connection between the drive racks and the rack drive mechanism.

The shaft 87 and zero stop arms 286 are rocked by power under control of the total and sub-total bars 17 and 18, respectively, and for this purpose an arm 288 (Fig. 12) is keyed to the shaft 87 and is connected through a pin-on-slot arrangement 289 to a floating lever 290. The forward end of the lever is pivoted to the lower end of a link 292, the upper end of which is connected to a cross link 293 intermediate its ends. The latter is pivotally connected to the pins 232 underlying the total and sub-total bars 17 and 18. Upon depression of either of the bars, the link 292 will be lowered sufficiently to rock the lever 290 about a frame pin 277 to position a hook 294 on the lever 290 in the path of a pin 295 carried by the cam follower 281 so that as the latter is rocked at the beginning of a total or sub-total operation the pin 295 will drive the lever 290 forwardly, rocking the shaft 87 against the action of a spring 291 to likewise rock the arms 286 into their zero, blocking positions. Thus, as the machine continues its cycle, the racks will be driven forwardly, rotating the accumulator gears 86 in a subtractive direction until they are stopped in their zero positions. The racks will therefore stand in positions mechanically representing the value previously registered by the accumulator and during the printing phase this amount will be printed.

*Miscellaneous controls*

Figure 14:
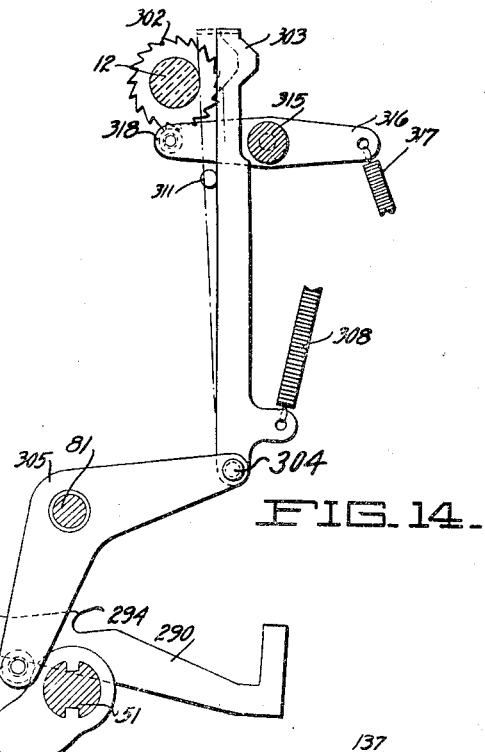
Fig. 14 is a side view of the platen rotating mechanism.

A paper strip on which the factors and results of computation performed by the machine are printed is fed at certain increments past the printing station by the platen 12. For this purpose, a ratchet 302 (Fig. 14) is attached to the platen and is fed by the upper ear of a pawl 303 pivotally connected at 304 to a cam follower 305. The latter is pivoted on the shaft 81 and carries a roller 306 held in engagement with a cam 307 on the drive shaft 51 by a spring 308. The spring 308 is also effective to maintain the pawl 303 in sliding engagement with a pin 311 which for the purpose of the present disclosure may be considered as stationary.

A centralizer 316 is pivoted on a frame pin 315 and is urged clockwise by a spring 317 to hold a roller 318 thereon against the teeth of the ratchet.

In normal addition and subtraction operations the amount keys 9 are automatically released near the end of each machine cycle while in repeat operations controlled by the repeat bar 15, the keys are allowed to remain in their set positions throughout a repeated number of cycles during which the repeat bar is held depressed. For this purpose, a cam 338 (Fig. 15) is keyed on the shaft 51 and actuates a roller 339 and a cam follower 340 pivoted on the shaft 81 and urged counter-clockwise by a tension spring 340'. A key release link 217 is pivoted to the cam follower 340 and is urged upward by a spring 341 tensioned between the cam follower and the link, thereby holding the forward end of the link against a pin 241 on the aforementioned bell-crank 239. When the repeat bar is in its raised position, as shown in Fig. 15, a pin 342 on the link 217 is positioned directly in front of a key release bell-crank 343 pivoted at 344. The latter is effective upon counter-clockwise rocking movement thereof to release the various amount keys in a manner not shown. Therefore, during operation of the machine under the above conditions the cam 338 will be effective during the latter part of the machine cycle to release the keys.

In repeat operations, however, depression of the repeat bar 15 will cause the associated pin 241 to lower the forward end of the link 217 so that its pin 342 will, upon subsequent reciprocation of the link by the cam 338, miss the bell-crank 343, allowing the amount keys to remain in their depressed positions.

In order to prevent the repeat bar 15 from being allowed to be raised before the end of any one cycle in the event the operator removes his finger from the key before the cycle is completed, a latch 351 is provided. The latter is pivoted at 352 and is urged forwardly by a tension spring 353. A latching shoulder 354 is formed on the latch and is adapted to latch the pin 241 in its lowermost position.

At the end of each cycle the latch will be released by a pin 355 carried by the link 217, and following release of the repeat bar the release of the latch will permit bell-crank 239 to raise to terminate operation of the machine.

At the end of each cycle, the pin 355 on the link 217 rocks the latch 351 counter-clockwise thus unlatching the pin 241 and if it is not otherwise held depressed by continued finger pressure on the bar 15 the bell-crank 239 will move upward under the action of its spring whereby the parts may return to their normal positions shown in Fig. 15. This action will occur after the pin 342 has passed below the bell-crank 343 and therefore the latter will not be actuated at this time to release the amount keys.

Although I have described my invention in detail and have therefore used certain terms and languages herein, it is to be understood that the present disclosure is illustrative rather than restrictive and that changes and modifications may be made without departing from the spirit or scope of the invention as set forth in the claims appended hereto.

Having thus described the invention, what I desired to secure by United States Letters Patent is:

1. In a cyclically operable calculating machine, the combination comprising a reversible coaxial accumulator, a plurality of unitary racks for actuating said accumulator, said racks being mounted for rectilinear movement forwardly and rearwardly relative to said machine, means for yieldably driving said racks forwardly from initial positions and for returning said racks to said initial positions, said means comprising a drive shaft cyclically operable through one complete revolution, an inclined keyboard including a plurality of depressible keys located above said racks, each key having a stem fixed thereto and movable into the path of an associated rack whereby to differentially limit forward movement of said racks; means for rendering said racks effective to selectively directly drive said accumulator in either of opposite directions during said forward movement and for rendering said racks ineffective to drive said accumulator during said return movement, a tens transfer mechanism for said accumulator including a unidirectionally rotatable member, and means independent of said rack drive means but driven by said drive shaft for causing a complete rotation of said rotatable member during said return movement of said racks.

2. In a cyclically operable calculating machine, the combination comprising a reversible coaxial accumulator, a plurality of unitary racks for actuating said accumulator, said racks being mounted for rectilinear movement forwardly and rearwardly relative to said machine, means for yieldably driving said racks forwardly from initial positions and for returning said racks to said initial positions, said means comprising a drive shaft cyclically operable through one complete revolution, an inclined keyboard including a plurality of depressible keys located above said racks, each key having a stem fixed thereto and movable into the path of an associated rack whereby to differentially limit forward movement of said racks; means for setting said accumulator in either of two operative direct connections with said racks whereby to respectively add or subtract amounts into said accumulator, means for maintaining said accumulator in operative connection with said racks during forward movement of said racks and for maintaining said accumulator out of operative connection with said racks during return movement of said racks, a tens transfer mechanism for said accumulator including a unidirectionally rotatable member, and means independent of said rack drive means but driven by said drive shaft for causing a complete rotation of said rotatable member during said return movement of said racks.

ROBERT E. BOYDEN.

References Cited in the file of this patent

UNITED STATES PATENTS

| Number | Name | Date |
|---|---|---|
| 1,195,567 | Draughon | Aug. 22, 1916 |
| 1,979,295 | Sundstrand | Nov. 6, 1934 |
| 2,057,606 | Campos | Oct. 13, 1936 |
| 2,124,177 | Lasker et al. | July 19, 1938 |
| 2,194,270 | Sundstrand | Mar. 19, 1940 |